United States Patent

[11] 3,617,199

| [72] | Inventor | William M. Russell |
| | | Belchertown, Mass. |
| [21] | Appl. No. | 823,956 |
| [22] | Filed | May 12, 1969 |
| [45] | Patented | Nov. 2, 1971 |
| [73] | Assignee | Johnson & Johnson |
| | | Continuation-in-part of application Ser. No. 407,865, Oct. 30, 1964, now abandoned. |

[54] ALKALI METAL CHLORIDES AND NITRATES USED TO INHIBIT CELLULOSE DEGRADATION IN ACID CATALYZED CROSS-LINKING PROCESSES
10 Claims, No Drawings

[52] U.S. Cl............................................... 8/116.4,
8/120, 8/133
[51] Int. Cl........................................... D06m 11/04,
D06m 13/14, D06m 13/12
[50] Field of Search.................................. 8/116.4,
120

[56] References Cited
UNITED STATES PATENTS
| 2,541,457 | 2/1951 | Beer........................... | 8/116.4 |
| 2,826,514 | 3/1958 | Schroeder..................... | 8/116.4 X |
| 3,089,747 | 5/1963 | Welch......................... | 8/116.4 X |
| 3,113,826 | 12/1963 | Dual et al.................... | 8/116.4 |
| 3,118,725 | 1/1964 | Henry et al................... | 8/116.4 |
| 3,130,001 | 4/1964 | Fenner et al.................. | 8/116.4 X |

Primary Examiner—George F. Lesmes
Assistant Examiner—J. Cannon
Attorneys—Alexander T. Kardos and Robert L. Minier ABSTRACT: A process for treating a cellulose-containing textile material which comprises impregnating said material with a member selected from the group consisting of aldehydes, polymeric condensation products of diethylene glycol and formaldehyde, and mixtures of hydroxy-containing hemiacetals, in the presence of from about 0.1 percent to about 10 percent by weight of a metal sulfate selected from the group consisting of magnesium sulfate and zinc sulfate, and from about 0.05 percent to about 6 percent by weight of a chloride or nitrate anion donor selected from the group consisting of sodium chloride, potassium chloride, and sodium nitrate, and drying and curing said treated material to provide improved shrink and wrinkle resistance with minimized loss in tensile strength.

ALKALI METAL CHLORIDES AND NITRATES USED TO INHIBIT CELLULOSE DEGRADATION IN ACID CATALYZED CROSS-LINKING PROCESSES

This patent application is a continuation-in-part of my earlier filed, copending patent application, Ser. No. 407,865, filed on Oct. 30, 1964 now abandoned.

This invention is concerned with the treatment of cellulose material whereby such material is rendered shrinkage and wrinkle resistant, and particularly to a new catalyst system beneficially contributing to the results sought when an aldehyde, or aldehyde-containing, reactant is cross-linked with cellulose.

The chemical reaction of an aldehyde with cellulose, and specifically formaldehyde with cellulose, is basically similar to its reaction with other hydroxyl compounds; however, the results obtained are modified by the effect of the reaction conditions on the complex carbohydrate molecule involved and the various forms in which it occurs. Under acid conditions formaldehyde reacts with cellulose to produce stable methylene ethers or formulas; however, the resultant cross-linking changes both the physical and chemical properties of the cellulose. Among these changes are an increase in the elastic recovery of the cellulose material along with a reduction in swelling on exposure to aqueous alkalies or water and a decrease in alkali solubility, thereby imparting wash-wear performance and shrinkage control.

There are limitations to such treatment and one of paramount importance is the concentration and the nature of the catalyst. Strong acid catalysts cause cellulose degradation. Thus it is important that there is selected, the weakest acid catalyst that will permit the reaction to take place, since this will produce the best results. Among the catalysts the art has utilized where an aldehyde or aldehyde-containing reactant is cross-linked with a cellulose, are ammonium chloride, aluminum chloride, and zinc nitrate to name a few. But magnesium chloride is the standout catalyst for this reaction because of its low tendency to tender the cellulose material and because of its efficiency crosslinking promoting the cross-linking reaction. However, magnesium chloride has certain known disadvantages such as the side effect of acid hydrolysis of cellulose which results in excessive loss of tensile strength in the treated cellulose textile fabric. This is especially noticeable in systems using unmodified formaldehyde.

These and other disadvantages are overcome by the instant inventive process for treating a cellulose or a cellulose-containing textile fabric which comprises impregnating said fabric with a member selected from the group consisting of an aldehyde-containing solution and an aldehyde, in the presence of a mixed double salt catalyst under acid conditions and drying and curing.

Representative of these aldehydes are formaldehyde, acetaldehyde, propionaldehyde, n-butyraldehyde, isobutyraldehyde, valeraldehyde, glyoxal, acrylaldehyde, crotonaldehyde, propionaldehyde, mixtures thereof and the like. Beneficial results are obtained using this invention when any cross-linking cellulose reactant containing an aldehyde group is used; however, significantly beneficial results of a surprising nature occur when the aldehyde used is nonnitrogenous. Formaldehyde is the preferred aldehyde; however, it is not necessary to use formaldehyde per se since various materials such as paraformaldehyde, formalin, trioxane, methylal, and similar formaldehyde-containing or formaldehyde-generating compounds may be used as sources of formaldehyde.

The term mixed double salt catalyst is meant to define a catalyst comprising a mixture of a metal sulfate such as magnesium or zinc sulfate where the metal is derived from Group II of the Periodic Table and either an alkali metal nitrate salt such as sodium nitrate or an alkali metal halide such as potassium or sodium chloride.

Preferably the instant invention provides a process for treating a cellulose or cellulose-containing textile fabric which comprises impregnating said fabric with a formaldehyde-containing solution in the presence of a mixed double salt catalyst under acid conditions, drying and curing said treated fabric to provide improved shrink and wrinkle resistance.

Then a catalyst system is provided which comprises a mixture of from about 0.1 percent to about 10 percent by weight of a metal sulfate, where said metal is selected from the group consisting of Group II metals of the Periodic Table, and from about 0.05 percent to about 6 percent by weight of a member selected from the group consisting of an alkali metal nitrate and an alkali metal halide. The weights given are based on the total amount of the salt deposited on the fabric.

With less than either 0.1 percent by weight of the metal sulfate or 0.05 percent by weight of either the alkali metal nitrate or the alkali metal halide, insufficient salt is present to provide an effective catalyst system within the meaning of this invention. If above the above-recited maximum amounts are present, acid degradation appears.

The amounts of either of the catalyst constituents could be stated in terms of the single salt one wishes to replace, i.e. for magnesium chloride hexahydrate one would need 0.5 percent to 10 percent by weight, based on the total weight of the fabric. Translated into magnesium sulfate heptahydrate and sodium chloride, this would be 0.6 percent to 12 percent and 0.29 percent to 5.8 percent by weight, respectively. For zinc hexahydrate, the amount deposited on the fabric should be from 0.2 percent to 3 percent by weight, based on the total weight of the salts deposited on the fabric. The amount of zinc sulfate and sodium nitrate required to "synthesize" this can be easily calculated.

It has been recited that acid conditions are desired for such a process but that strong acids should be avoided. This simply reflects the requirement that at the time of cure, slightly acid conditions should be in evidence.

The amount of wet pickup is controlled, such as by adjustable nip rolls, and depends upon many factors notably the concentration of the formaldehyde in the treating bath. Normally, however, a wet pickup of from about 50 percent to about 300 percent by weight, based on the weight of the material being treated, is employed, with a preferred range extending from about 75 percent to about 150 percent, with optimum results at about 100 percent.

The impregnated textile fabric is dried at a temperature from about 160° F. to about 350° F. and cured at a temperature from about 270° F. to about 375° F. for a period ranging from about 10 minutes to about one-half minute. It is to be appreciated that, although drying and curing are described herein as two separate procedural steps, they could be combined into one step at a temperature from about 250° F. to about 400° F.

After curing, the fabric may be washed lightly in an aqueous media containing a detergent and a mild alkali, rinsed thoroughly and dried.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

For example, reference will be made in these Examples to "Reactant SC" and to "Acrite-100." Reactant SC is sold by the Quaker Chemical Corporation and is a polymeric condensation product of diethylene glycol and paraformaldehyde. The product and methods of manufacturing it are well known in the prior art and are described, for example, in example I of U.S. Pat. No. 2,786,081 which issued Mar. 19, 1957, well before the filing of this patent application. Acrite-100 is sold by Shell Chemical Corporation and is a mixture of hydroxy-containing hemiacetals. The product is prepared, for example, by reacting 2 moles of formaldehyde with 1 mole of acrolein in the presence of sulfuric acid. The product and methods of manufacturing it are well known in the prior art and are described, for example, in the examples of U.S. Pat. No. 3,080,281, which issued Mar. 5, 1963, well before the filing of this patent application.

EXAMPLE I

The basic procedure of this invention comprises treating a cellulose material with an aldehyde, or an aldehyde-containing, cellulose reactant to effect cross-linking of the cellulose with the aldehyde. This is conveniently accomplished by padding the solution of the aldehyde onto the cellulose textile material by means of a conventional padder using a single dip and single nip. The wet pickup is adjustably controlled to approximately 80 percent of the weight of the cellulose material being treated.

After the aldehyde solution is applied to the cellulose textile material, drying and curing take place. The materials may be framed in a clip tenter frame to to their original dry dimensions and are dried at a temperature of about 250° F. for about 5 minutes. Curing may take place in forced hot air ovens at a temperature of 325° F. for about 2½ minutes. The treated material is then washed lightly in water containing detergent and a mild alkali to remove the catalyst and any unreacted aldehyde. The material is again dried on a tenter frame and is then ready for testing.

The degree of wrinkle resistance is measured on a standard Monsanto Wrinkle Recovery Instrument which measures the angular recovery of the test material which has been creased in half by a definite weight for a given time at a standard temperature and humidity. For further details of this test procedure see ASTM D 1295–60T.

The treated fabric is given a wash-wear rating in accordance with test procedure AATCC 88–60T and the filling tensile strength was determined in all instances using the grab method in accordance with ASTM D 1682–59T.

The cellulose textile material is a 109×60 cotton broadcloth (3 oz. per square yard) which has been bleached and mercerized.

The following formulations are applied to samples of the above-described cotton broadcloth and the treated textile is tested for wrinkle recovery, filling tensile strength and each is given a wash-wear rating. It is to be noted that formulation VIII is the control and that formulation I utilizes as a catalyst, magnesium chloride, which is presently considered by the art to be the most rewarding of the catalysts available in that the wrinkle recovery of the treated fabric is good and the wash-wear rating is good.

however, the residual strength of the treated fabric is significantly higher when the double salt catalyst of this invention is used.

The optimum ratio of $MgSO_4 \cdot 7H_2O$ to $NaCl$ is 2.08:1, i.e. 4.8/2.3 (see formulation V). This ratio is stoichiometrically equivalent to $MgCl \cdot 6H_2O$; therefore, formulation V is equivalent to formulation I in the amount of magnesium chloride synthesized.

It is also evident that replacing sodium chloride with potassium chloride effected similar results.

EXAMPLE II

The procedures of example I are followed and a similar 109×60 cotton broadcloth is treated with the following formulations:

| Constituents | Formulations, with constituents given in parts by weight based on total weight | | | |
|---|---|---|---|---|
| | I | II | III | IV |
| Demineralized Water | 90.0 | 87.2 | 86.9 | 85.2 |
| 37% Formaldehyde | 6.0 | 6.0 | 6.0 | 10.0 |
| $MgCl_2 \cdot H_2O$ | 4.0 | 4.0 | | |
| $Na_2SO_4$ | | 2.8 | | |
| $MgSO_4 \cdot 7H_2O$ | | | 4.8 | 4.8 |
| NaCl | | | 2.3 | |
| Physical Properties After Four Hot Bendix Washes | | | | |
| Wrinkle Recovery | 140° | 135° | 141° | 102° |
| Filling Tensile-Lbs. | 16.4 | 16.5 | 20.3 | 29.8 |
| Wash-Wear Rating (tumble dried) | 4.7 | 5.0 | 5.0 | 2.0 |

It is to be noted that the addition of sodium sulfate to the magnesium chloride catalyst system did not improve the strength of the treated textile fabric, but that the use of the

| | Formulations, with constituents given in parts by weight based on the total weight | | | | | | | |
|---|---|---|---|---|---|---|---|---|
| | I | II | III | IV | V | VI | VII | VIII |
| Constituents: | | | | | | | | |
| Demineralized water | 88.0 | 87.2 | 86.4 | 85.4 | 84.9 | 84.4 | 84.2 | 100 |
| Reactant SC [1] | 4.0 | 4.0 | 4.0 | 4.0 | 4.0 | 4.0 | 4.0 | 4.0 |
| 37% formaldehyde | 4.0 | 4.0 | 4.0 | 4.0 | 4.0 | 4.0 | 4.0 | 4.0 |
| $MgCl_2 \cdot 6H_2O$ | 4.0 | | | | | | | |
| $MgSO_4 \cdot 7H_2O$ | | 4.8 | 4.8 | 4.8 | 4.8 | 4.8 | 4.8 | |
| NaCl | | | 0.8 | 1.8 | 2.3 | 2.8 | | |
| KCl | | | | | | | 3.0 | |
| Physical properties after three hot Bendix washes: | | | | | | | | |
| Wrinkle Recovery, degrees | 110 | 87 | 99 | 102 | 111 | 109 | 106 | 85 |
| Filling tensile, lbs | 20.7 | 41.7 | 31.9 | 28.6 | 25.7 | 24.3 | 26.3 | 41.0 |
| Wash-wear rating | 3.5 | 1.0 | 1.0 | 3.0 | 4.0 | 3.5 | 3.0 | 1.0 |

[1] A polyacetal (diethylene glycol and formaldehyde) sold by Quaker Chemical Company.

It is evident that the formulation utilizing magnesium chloride, i.e. magnesium chloride hexahydrate, as the catalyst, resulted in significantly more tensile loss than did a corresponding formulation where the magnesium chloride had been replaced by the double salt catalyst of this invention. It should also be noted that magnesium sulfate, i.e. magnesium sulfate heptahydrate, does not perform as an effective catalyst in this system.

The magnesium sulfate/sodium chloride catalyst is appreciably effective with observable cross-linking efficiency equivalent to that resulting when magnesium chloride is used;

magnesium sulfate/sodium chloride catalyst system did result in significantly improved strength in the textile fabric with no detrimental effect on wash-wear or wrinkle recovery. Additionally, magnesium sulfate by itself did not prove an effective catalyst for the formaldehyde treatment.

EXAMPLE III

Basically, the procedure of example I is again followed except that the aldehyde constituent is substituted for, and the cure time varied. The base fabric remains the same as that of example I.

| | I | | II | | III | | IV |
|---|---|---|---|---|---|---|---|
| Water | 88.0 | | 86.6 | | 86.45 | | 100 |
| Acrite-100 [1] | 10.0 | | 10.0 | | 10.0 | | |
| $MgCl_2 \cdot 6H_2O$ | 2.0 | | 2.0 | | | | |
| $MgSO_4 \cdot 7H_2O$ | | | | | 2.4 | | |
| NaCl | | | | | 1.15 | | |
| $Na_2SO_4$ | | | 1.4 | | | | |
| Mix pH | 4.4 | | 4.8 | | 4.1 | | |
| Cure conditions, ° F | 300 | 320 | 300 | 320 | 300 | 320 | |
| Wrinkle recovery, degrees | 113 | 123 | 108 | 126 | 110 | 122 | 91 |
| Filling tensile, lbs | 30.2 | 22.5 | 32.6 | 23.3 | 33.4 | 27.6 | 46.2 |
| Wash-Wear (tumble dried) | 3.8 | 4.5 | 4.0 | 4.5 | 4.0 | 4.3 | 1.5 |

[1] Acrite-100 is a non-nitrogenous aldehyde cellulose reactant manufactured by Shell Chemical Company.

The physical properties of the treated and cured textile fabric are taken after this fabric receives four household washes. It is shown that the magnesium chloride catalyst causes excessive damage when the fabric is exposed to a cure of 320° F. It is seen that the use of sodium sulfate along with magnesium chloride did not significantly reduce strength loss at the 320° F. cure; however, the mixed salt catalyst, i.e. NaCl/MgSO$_4$, produced a fabric having wash-wear and crease resistance equivalent to the magnesium chloride system and the residual strength was significantly better.

EXAMPLE IV

Once again following the procedures given in example I, formulations are prepared and a 109×60 cotton broadcloth (3 oz./sq. yard) which has been bleached and mercerized is the base fabric. The treated fabric is dried at 250° F. for 5 minutes and cured at 320° F. for 2½ minutes. The formulations are as follows, with all parts given in percent by weight based on the total weight.

|  | I | II | III |
|---|---|---|---|
| Water | 90.5 | 90.5 | 89.7 |
| Reactant SC | 4.0 | 4.0 | 4.0 |
| 37% Formaldehyde | 4.0 | 4.0 | 4.0 |
| Zn(NO$_3$)$_2$·6H$_2$O | 1.5 | | |
| ZnSO$_4$·7H$_2$O | | 1.5 | 1.5 |
| NaNO$_3$ | | | 0.8 |
| Wrinkle Recovery | 112° | 98° | 117° |
| Filling Tensile-Lbs. | 19.8 | 30.6 | 26.4 |
| Wash-Wear Rating | 3.0 | 1.5 | 3.5 |

The physical properties given above are measured after the fabric has, in each case, received four household washes. These results show that zinc sulfate along is not an effective catalyst in this system. It also establishes that the mixed salt catalyst, i.e. zinc sulfate/sodium nitrate, in an amount stoichiometrically equivalent to zinc nitrate, produces good wash-wear performance and wrinkle recovery (equivalent to zinc nitrate) with considerably less tensile strength loss.

EXAMPLE V

The procedures of example I are followed substantially as set forth therein with the exception that the formulation applied to the cotton broadcloth is as follows:

| | Parts by Weight |
|---|---|
| Demineralized water | 87.2 |
| Condensation product of diethylene glycol and paraformaldehyde, per example I, U.S. Pat. No. 2,786,081 | 4.0 |
| 37% Formaldehyde | 4.0 |
| MgSO$_4$·H$_2$O | 2.2 |
| NaNO$_3$ | 2.6 |
| Total: | 100.0 |

The results are comparable to those obtained in example I. Comparison of the results of this example with the results obtained by using 4% Mg(NO$_3$)$_2$·6H$_2$O, a prior art catalyst, indicate that the treated fabric of this example possesses better wrinkle recovery, improved filling tensile strength, and at least comparable wash-wear ratings.

EXAMPLE VI

The procedures of example I are followed substantially as set forth therein with the exception that the formulation applied to the cotton broadcloth is as follows:

| | Parts by Weight |
|---|---|
| Demineralized Water | 87.5 |
| Condensation product of diethylene glycol and paraformaldehyde, per example I, U.S. Pat. No. 2,786,081 | 4.0 |
| 37% Formaldehyde | 4.0 |
| MgSO$_4$ | 1.9 |
| NaNO$_3$ | 2.6 |
| Total: | 100.0 |

The results are comparable to those obtained in example I. Comparison of the results of this example with the results obtained by using 4% Mg(NO$_3$)$_2$·6H$_2$O, a prior art catalyst, indicate that the treated fabric of this example possesses better wrinkle recovery, improved filling tensile strength, and at least comparable wash-wear ratings.

EXAMPLE VII

The procedures of example I are followed substantially as set forth therein with the exception that the formulation applied to the cotton broadcloth is as follows:

| | Parts by Weight |
|---|---|
| Demineralized water | 86.3 |
| Condensation product of diethylene glycol and paraformaldehyde, per example I, U.S. Pat. No. 2,786,081 | 4.0 |
| 37% Formaldehyde | 4.0 |
| ZnSO$_4$·6H$_2$O | 4.0 |
| NaCl | 1.7 |
| Total: | 100.0 |

The results are comparable to those obtained in example I. Comparison of the results of this example with the results obtained by using 2% ZnCl$_2$, a prior art catalyst, indicate that the treated fabric of this example possesses better wrinkle recovery, improved filling tensile strength, and at least comparable wash-wear ratings.

EXAMPLE VIII

The procedures of example I are followed substantially as set forth therein with the exception that the formulation applied to the cotton broadcloth is as follows:

| | Parts by Weight |
|---|---|
| Demineralized water | 85.8 |
| Condensation product of diethylene glycol and paraformaldehyde, per example I, U.S. Pat. No. 2,786,081 | 4.0 |
| 37% Formaldehyde | 4.0 |
| ZnSO$_4$·6H$_2$O | 4.0 |
| KCl | 2.2 |
| Total: | 100.0 |

The results are comparable to those obtained in example I. Comparison of the results of this example with the results obtained by using 2% ZnCl$_2$, a prior art catalyst, indicate that the treated fabric of this example possesses better wrinkle recovery, improved filling tensile strength, and at least comparable wash-wear ratings.

EXAMPLE IX

The procedures of example I are followed substantially as set forth therein with the exception that the formulation applied to the cotton broadcloth is as follows:

| | Parts by Weight |
|---|---|
| Demineralized water | 87.9 |
| Condensation product of diethylene glycol and paraformaldehyde, per example I, U.S. Pat. No. 2,786,081 | 4.0 |
| 37% Formaldehyde | 4.0 |
| ZnSO$_4$ | 2.4 |
| NaCl | 1.7 |
| Total: | 100.0 |

The results are comparable to those obtained in example I. Comparison of the results of this example with the results obtained by using 2% $ZnCl_2$, a prior art catalyst, indicate that the treated fabric of this example possesses better wrinkle recovery, improved filling tensile strength, and at least comparable wash-wear ratings.

EXAMPLE X

The procedures of example I are followed substantially as set forth therein with the exception that the formulation applied to the cotton broadcloth is as follows:

|  | Parts by Weight |
|---|---|
| Demineralized water | 87.4 |
| Condensation product of diethylene glycol and paraformaldehyde, per example I, U.S. Pat. No. 2,786,081 | 4.0 |
| 37% Formaldehyde | 4.0 |
| $ZnSO_4$ | 2.4 |
| KCl | 2.2 |
| Total: | 100.0 |

The results are comparable to those obtained in example I. Comparison of the results of this example with the results obtained by using 2% $ZnCl_2$, a prior art catalyst, indicate that the treated fabric of this example possesses better wrinkle recovery, improved filling tensile strength, and at least comparable wash-wear ratings.

EXAMPLE XI

The procedures of example I are followed substantially as set forth therein with the exception that the formulation applied to the cotton broadcloth is as follows:

|  | Parts by Weight |
|---|---|
| Demineralized water | 86.6 |
| Condensation product of diethylene glycol and paraformaldehyde, per example I, U.S. Pat. No. 2,786,081 | 4.0 |
| 37% Formaldehyde | 4.0 |
| $MgSO_4 \cdot H_2O$ | 2.9 |
| NaCl | 2.5 |
| Total: | 100.0 |

The results are comparable to those obtained in example I. Comparison of the results of this example with the results obtained by using 2% $MgCl_2$, a prior art catalyst, indicate that the treated fabric of this example possesses better wrinkle recovery, improved filling tensile strength, and at least comparable wash-wear ratings.

EXAMPLE XII

The procedures of example I are followed substantially as set forth therein with the exception that the formulation applied to the cotton broadcloth is as follows:

|  | Parts by Weight |
|---|---|
| Demineralized water | 85.9 |
| Condensation product of diethylene glycol and paraformaldehyde, per example I, U.S. Pat. No. 2,786,081 | 4.0 |
| 37% Formaldehyde | 4.0 |
| $MgSO_4 \cdot H_2O$ | 2.9 |
| KCl | 3.2 |
| Total: | 100.0 |

The results are comparable to those obtained in example I. Comparison of the results of this example with the results obtained by using 2% $MgCl_2$, a prior art catalyst, indicate that the treated fabric of this example possesses better wrinkle recovery, improved filling tensile strength, and at least comparable wash-wear ratings.

EXAMPLE XIII

The procedures of example I are followed substantially as set forth therein with the exception that the formulation applied to the cotton broadcloth is as follows:

|  | Parts by Weight |
|---|---|
| Demineralized water | 87.0 |
| Condensation product of diethylene glycol and paraformaldehyde, per example I, U.S. Pat. No. 2,786,081 | 4.0 |
| 37% Formaldehyde | 4.0 |
| $MgSO_4$ | 2.5 |
| NaCl | 2.5 |
| Total: | 100.0 |

The results are comparable to those obtained in example I. Comparison of the results of this example with the results obtained by using 2% $MgCl_2$, a prior art catalyst, indicate that the treated fabric of this example possesses better wrinkle recovery, improved filling tensile strength, and at least comparable wash-wear ratings.

EXAMPLE XIV

The procedures of example I are followed substantially as set forth therein with the exception that the formulation applied to the cotton broadcloth is as follows:

|  | Parts by Weight |
|---|---|
| Demineralized water | 86.3 |
| Condensation product of diethylene glycol and paraformaldehyde, per example I, U.S. Pat. No. 2,786,081 | 4.0 |
| 37% Formaldehyde | 4.0 |
| $MgSO_4$ | 2.5 |
| KCl | 3.2 |
| Total: | 100.0 |

The results are comparable to those obtained in example I. Comparison of the results of this example with the results obtained by using 2% $MgCl_2$, a prior art catalyst, indicate that the treated fabric of this example possesses better wrinkle recovery, improved filling tensile strength, and at least comparable wash-wear ratings.

Although several specific embodiments of this invention have been described, the invention is to be limited only by the following claims. It is also to be appreciated that many modifications are apparent without departure from the inventive concept described herein.

What is claimed is:

1. A process for treating a cellulose-containing textile material which comprises impregnating said material with a member selected from the group consisting of aldehydes, polymeric condensation products of diethylene glycol and formaldehyde, and mixtures of hydroxy-containing hemiacetals which are reaction products of formaldehyde and acrolein, in the presence of from about 0.1 percent to about 10 percent by weight of a metal sulfate selected from the group consisting of magnesium sulfate and zinc sulfate, and from about 0.05 percent to about 6 percent by weight of a chloride or nitrate anion donor selected from the group consisting of sodium chloride, potassium chloride, and sodium nitrate, and drying and curing said treated material to provide improved shrink and wrinkle resistance with minimized loss in tensile strength.

2. A process as defined in claim 1 wherein the metal sulfate is magnesium sulfate.

3. A process as defined in claim 2 wherein the chloride anion donor is sodium chloride.

4. A process as defined in claim 2 wherein the chloride anion donor is potassium chloride.

5. A process as defined in claim 2 wherein the nitrate anion donor is sodium nitrate.

6. A process as defined in claim 1 wherein the metal sulfate is zinc sulfate.

7. A process as defined in claim 6 wherein the chloride anion donor is sodium chloride.

8. A process as defined in claim 6 wherein the chloride anion donor is potassium chloride.

9. A process as defined in claim 6 wherein the nitrate anion donor is sodium nitrate.

10. A process as defined in claim 1 wherein the molar ratio of the formaldehyde to the acrolein is 2:1.